United States Patent
Bisso et al.

(10) Patent No.: US 8,732,473 B2
(45) Date of Patent: May 20, 2014

(54) CLAIM BASED CONTENT REPUTATION SERVICE

(75) Inventors: Robert Bisso, Saint James, NY (US); Vadim Ismailov, Holtsville, NY (US); Lingling Liu, Commack, NY (US); Robert Saccone, Glen Head, NY (US); Mukeshkumar Beher, Smithtown, NY (US)

(73) Assignee: Microsoft Corporation, Redmond, WA (US)

( * ) Notice: Subject to any disclaimer, the term of this patent is extended or adjusted under 35 U.S.C. 154(b) by 532 days.

(21) Appl. No.: 12/791,305

(22) Filed: Jun. 1, 2010

(65) Prior Publication Data

US 2011/0296187 A1 Dec. 1, 2011

(51) Int. Cl.
   *H04L 9/32* (2006.01)
(52) U.S. Cl.
   USPC ........... 713/176; 709/201; 709/213; 713/193; 726/22; 726/23; 726/24; 726/25
(58) Field of Classification Search
   None
   See application file for complete search history.

(56) References Cited

U.S. PATENT DOCUMENTS

| | | | |
|---|---|---|---|
| 6,094,731 A * | 7/2000 | Waldin et al. | 714/38.14 |
| 6,119,231 A | 9/2000 | Foss | |
| 6,611,925 B1 | 8/2003 | Spear | |
| 6,745,192 B1 | 6/2004 | Libenzi | |
| 6,928,550 B1 * | 8/2005 | Le Pennec et al. | 726/1 |
| 6,993,660 B1 | 1/2006 | Libenzi | |
| 7,124,305 B2 * | 10/2006 | Margolus et al. | 713/193 |
| 7,437,761 B2 | 10/2008 | Takahashi | |
| 7,441,274 B1 * | 10/2008 | Drew | 726/24 |
| 7,581,252 B2 | 8/2009 | Challener | |
| 7,689,835 B2 | 3/2010 | Palliyil | |
| 7,725,494 B2 * | 5/2010 | Rogers et al. | 707/802 |
| 7,742,992 B2 * | 6/2010 | Cronce | 705/59 |
| 8,291,496 B2 * | 10/2012 | Bennett | 726/23 |
| 8,582,137 B2 * | 11/2013 | Yoshimura et al. | 358/1.14 |

(Continued)

OTHER PUBLICATIONS

Hari Balakrishnan, M. Frans Kaashoek, David Karger, Robert Morris, Ion Stoica, Chord: A Scalable Peer-to-per Lookup Service for Internet Applications, Proceedings of the 2001 conference on Applications, technologies, architectures, and protocols for computer communications, Aug. 27-31, 2001, UC San Diego, USA.*

"International Search Report", Mailed Date: Feb. 9, 2012, Application No. PCT/US2011/036733, Filed Date: May 17, 2011, pp. 10.

(Continued)

*Primary Examiner* — Saleh Najjar
*Assistant Examiner* — Jason Plotkin
(74) *Attorney, Agent, or Firm* — Louise Bowman; Jim Ross; Micky Minhas

(57) ABSTRACT

In some embodiments, a system may comprise a database and one or more servers. The database may, for example, store a plurality of content claims for previously evaluated data items, with each of the plurality of content claims being associated in the database with a corresponding stored digital fingerprint of a previously evaluated data item. The server(s) may, for example, be configured to receive a determined digital fingerprint of a data item from a client device on another network node, to submit a query to the database using the determined digital fingerprint as a primary key, and to transmit one or more content claims returned by the query to the client device. In some embodiments, the server(s) may be further configured to receive the content claim(s) and the digital fingerprint associated therewith from one or more computers on another network node, and to cause the received content claim(s) and digital fingerprint associated therewith to be stored in the database.

20 Claims, 5 Drawing Sheets

(56) References Cited

U.S. PATENT DOCUMENTS

| | | | |
|---|---|---|---|
| 2004/0010703 A1* | 1/2004 | Kouznetsov et al. | 713/200 |
| 2005/0131904 A1* | 6/2005 | Margolus et al. | 707/10 |
| 2006/0095964 A1* | 5/2006 | Costea | 726/22 |
| 2008/0027867 A1 | 1/2008 | Forbes et al. | |
| 2008/0250100 A1* | 10/2008 | Hatanaka et al. | 709/203 |
| 2009/0043870 A1* | 2/2009 | Ikezoye et al. | 709/219 |
| 2012/0017275 A1* | 1/2012 | Harmonen | 726/24 |

OTHER PUBLICATIONS

A Survivability-Over-Security (SOS) Approach to Holistic Cyber-Ecosystem Assurance, published Jun. 2002, http://citeseerx.ist.psu.edu/viewdoc/download?doi=10.1.1.60.6295&rep=rep1&type=pdf.

Avfs: An on-Access Anti-Virus File System, published 2004, http://reference.kfupm.edu.sa/content/a/v/avfs__an__on__access__virus__file__syste__3458222.pdf.

\* cited by examiner

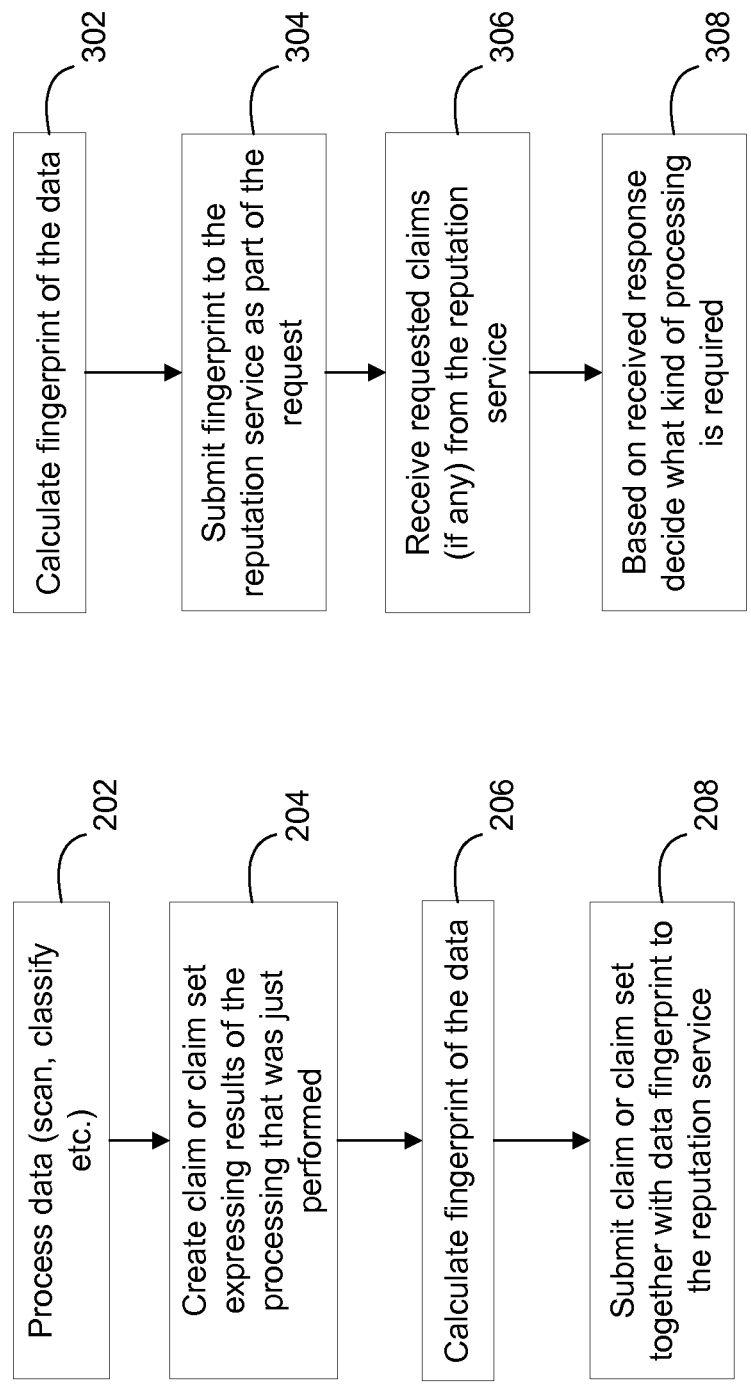

```
[ClaimSet]
[AlgorithmID: SHA1]
[Fingerprint: AD6578FF098873EE2DE1BFF4450F2A1BFF436785]
[Claim]
  Type=Bitmap
  Time=05/05/2010 23:11:17
  Assertion=FileType
  Issuer=FCI
  Data=NULL
[Claim]
  Type=ExplicitContent
  Time=05/06/2010 14:24:12
  Assertion=PropertyAbsent
  Issuer=ImageCategorizer
  Data=NULL
[Claim]
  Type=CopyrightedMaterial
  Time=05/06/2010 14:24:12
  Assertion=PropertyPresent
  Issuer=ImageCategorizer
  Data=NULL
[Claim]
  Type=Virus
  Time=05/06/2010 14:22:55
  Assertion=PropertyAbsent
  Issuer=Microsoft
  Data=0xfe657dff
[Claim]
  Type=Spyware
  Time=05/06/2010 11:14:01
  Assertion=PropertyAbsent
  Issuer=Kaspersky
  Data=<Kaspersky specific data>
```

Fig. 4

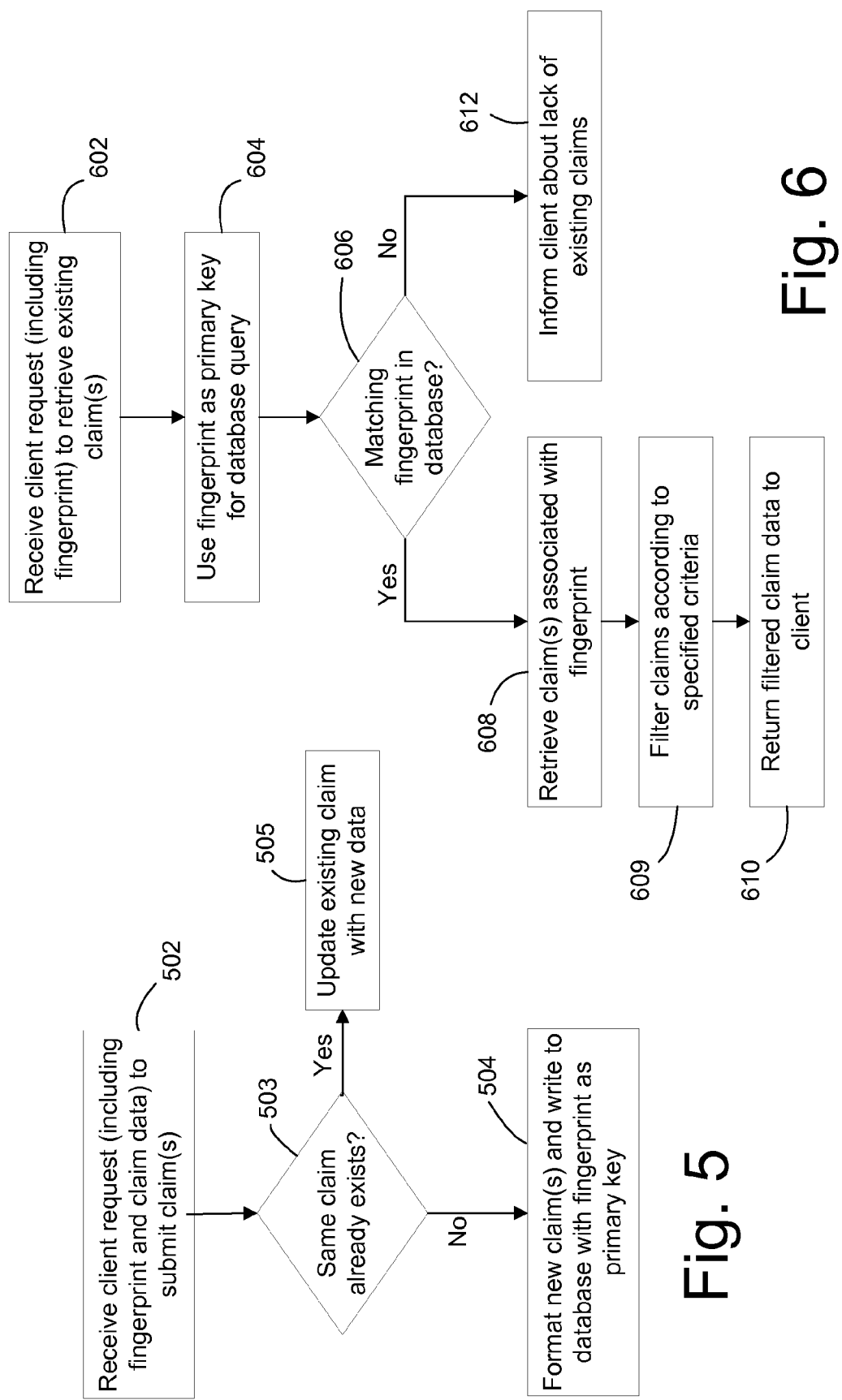

```xml
<ContentClaimSet>
    <Fingerprint algorithm="SHA1"
value="AD6578FF098873EE2DE1BFF4450F2A1BFF436785" />
    <ContentClaims>
        <ContentClaim type="Bitmap" time="2010-05-05T23:11:17Z"
assertion="FileType" Issuer="FCI" />
        <ContentClaim type="ExplicitContent" time="2010-05-06T14:24:12Z"
assertion="PropertyAbsent" Issuer="ImageCategorizer" />
        <ContentClaim type="CopyrightedMaterial" time="2010-05-06T14:24:12Z"
assertion="PropertyPresent" Issuer="ImageCategorizer" />
        <ContentClaim type="Virus" time="2010-05-06T14:22:55Z"
assertion="PropertyAbsent" Issuer="Microsoft">
            <Data>0xfe657dff</Data>
        </ContentClaim>
        <ContentClaim type="Spyware" time="2010-05-06T11:14:01Z"
assertion="PropertyAbsent" Issuer="Kaspersky">
            <Data>1H675j44IB7l0pYybHR2QSXsXQYS</Data>
        </ContentClaim>
    </ContentClaims>
    <Signature xmlns="http://www.w3.org/2000/09/xmldsig#">
        <SignedInfo>
            <CanonicalizationMethod Algorithm="http://www.w3.org/TR/2001/REC-
xml-c14n-20010315" />
            <SignatureMethod Algorithm="http://www.w3.org/2000/09/xmldsig#rsa-
sha1" />
            <Reference URI="">
                <Transforms>
                    <Transform Algorithm="http://www.w3.org/2000/
xmldsig#enveloped-signature" />
                </Transforms>
                <DigestMethod Algorithm="http://www.w3.org/2000/09/xmldsig#sha1" /
>
                <DigestValue>hapronkY7kBvxFggzkiQMp/Qpz8=</DigestValue>
            </Reference>
        </SignedInfo>
        <SignatureValue>ImrxJa7gx/531H675j44IBQSXsXQYS+e4N5j3ZDBQxbkKJGk...</
SignatureValue>
        <KeyInfo>
            <KeyValue>
                <RSAKeyValue>
                    <Modulus>lgT3XgoYCDGLmQB00Sh8VcLLD65FLpF7c+1MHlrw6mX671snc...</
Modulus>
                    <Exponent>AQAB</Exponent>
                </RSAKeyValue>
            </KeyValue>
            <KeyName>MS_CONTENT_REPUTATION</KeyName>
        </KeyInfo>
    </Signature>
</ContentClaimSet>
```

FIG. 7

CLAIM BASED CONTENT REPUTATION SERVICE

BACKGROUND

In order to ensure that digital data complies with business, security and other policies, the trend in recent years has been to subject such data to an ever increasing number of pre-access evaluation processes. Examples of such processes include hygiene scans, filtering, classifications, and data analysis. Particularly computationally intensive operations may include, for example, virus/spyware scans, spam detection, keyword detections, malicious/inappropriate/prohibited URL detection, data leakage prevention, data classification, etc.

The number of scanning/classification technologies that a piece of content needs be subjected to has continued to increase over time. In addition, the size of a typical piece of content that needs to be scanned has trended upwards and has shown no sign of leveling off. Both of these trends result in an ever increasing amount of computer resources (CPU, memory, network bandwidth, etc.) that are needed to perform scanning/classification.

The problem is further exacerbated by the fact that the data generally needs to be repeatedly re-analyzed, rescanned, and/or reclassified by various security and compliance products as it moves within or across computers networks. These products are typically installed on desktops, notebooks, different servers (like mail, file, collaboration, etc.), and services in the cloud. As data traverses each of these way points, the same computationally intensive operations are often performed over and over again. This leads to decreased performance and throughput of the system and requires installation of additional hardware, software, etc. In the case of services, the additional overhead can have a direct impact on the profitability of the service.

SUMMARY

In some embodiments of the invention, a system may comprise a database and one or more servers. The database may, for example, store a plurality of content claims for previously evaluated data items, with each of the plurality of content claims being associated in the database with a corresponding stored digital fingerprint of a previously evaluated data item. The server(s) may, for example, be configured to receive a determined digital fingerprint of a data item from a client device on another network node, to submit a query to the database using the determined digital fingerprint as a primary key, and to transmit one or more content claims returned by the query to the client device.

In some embodiments, the server(s) may be further configured to receive the content claim(s) and the digital fingerprint associated therewith from one or more computers on another network node, and to cause the received content claim(s) and digital fingerprint associated therewith to be stored in the database.

In some embodiments, the client device may comprise one or more computers configured to process the data item with a hash function to determine the fingerprint of the data item, to send a first message to the server(s) comprising the determined digital fingerprint of the data item, to receive a second message from the server(s) comprising the content claim(s) returned by the query, and to make a decision as to how to further process the data item based upon the content claim(s) included in the second message.

In some embodiments, a method for identifying one or more content claims for a data item involves comparing a digital fingerprint of the data item with a stored digital fingerprint associated with the content claim(s). If the determined digital fingerprint matches the stored digital fingerprint, then it is determined that the one or more content claims are associated with the determined digital fingerprint of the data item.

In some embodiments, one or more computer-readable storage mediums are encoded with instructions that, when executed by one or more processors at a first network node, cause the processor(s) to perform a method for identifying one or more content claims for a data item that includes steps of (a) comparing a determined digital fingerprint of the data item with a stored digital fingerprint associated with the content claim(s), and (b) if the determined digital fingerprint matches the stored digital fingerprint, then determining that the one or more content claim are associated with the determined digital fingerprint of the data item.

In some embodiments, the content claim(s) and the digital fingerprint associated therewith may be received from one or more computers at another network node, and the received content claim(s) and digital fingerprint associated therewith may be persistently stored.

In some embodiments, the determined digital fingerprint may be received from one or more computers at another network node, and the content claim(s) determined to be associated with the determined digital fingerprint of the data item may be transmitted to one or more computers at the other network node.

In some embodiments, a content certificate including both the stored digital fingerprint and the content claim(s) may be received from one or more computers at another network node.

In addition to or in lieu of the foregoing illustrative embodiments, one or more of the following characteristics, features and/or functions may additionally or alternatively be present in or practiced by some embodiments of the invention:

- The results of content hygiene, filtering, classification and other content analysis processes may be expressed as a set of content claims.
- Fingerprinting may be used as a non-intrusive and reliable mechanism for associating content claims with the data that was processed.
- The content reputation service may accept, aggregate, and store content claims submitted by participating trusted parties.
- The content reputation service may be queried for claims associated with a particular piece of data.
- Existing content claims may be invalidated when the configuration and/or security policy that was used when these claims were issued is changed.
- Time sensitive claims may be invalidated and removed from the reputation service database when predefined time period has elapsed.
- The content reputation service may be independent of the data formats that are being protected. For example, when a fingerprint is calculated, data may be treated simply as a byte stream, rather than data of a particular format, such that knowledge of data formats is not required by the system.
- The content reputation service may be independent of the transport protocols used to transfer data.
- The content reputation service may be independent of the storage type where data is stored.

The content reputation service may be communicated with (for the purpose of submitting and requesting claims) using different network protocols.

Use of the content reputation service may ensure that claims that were created for a file (or other digital content) will be associated with all other copies of the same file.

Exporting a content claim set and serializing it into secure and verifiable "content certificate" may allow it to be transmitted to interested parties that for some reason cannot communicate directly with the reputation service (or not aware of it altogether). The system may, for example, leverage known and accepted standards based technologies to format and secure such a content certificate. A client application may, for example, be able to associate a content certificate with the data it was issued about as well as to read one or more of the claims about such data.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings:

FIG. 2 shows an illustrative example of a routine a client may execute to submit one or more claims to a content reputation service;

FIG. 3 shows an illustrative example of a routine a client may execute to obtain one or more existing claims maintained by a content reputation service;

FIG. 4 is a conceptual representation of a claim set including actual claim data for an image;

FIG. 5 shows an illustrative example of a routine that may be executed by a server of a content reputation service to process a client request to submit a claim;

FIG. 6 shows an illustrative example of a routine a server of a content reputation service may execute to process a client request to retrieve and return a content claim; and FIG. 7 shows an illustrative example of how the claim set shown in FIG. 4 may appear when exported as a content certificate.

DETAILED DESCRIPTION

Figure 1:
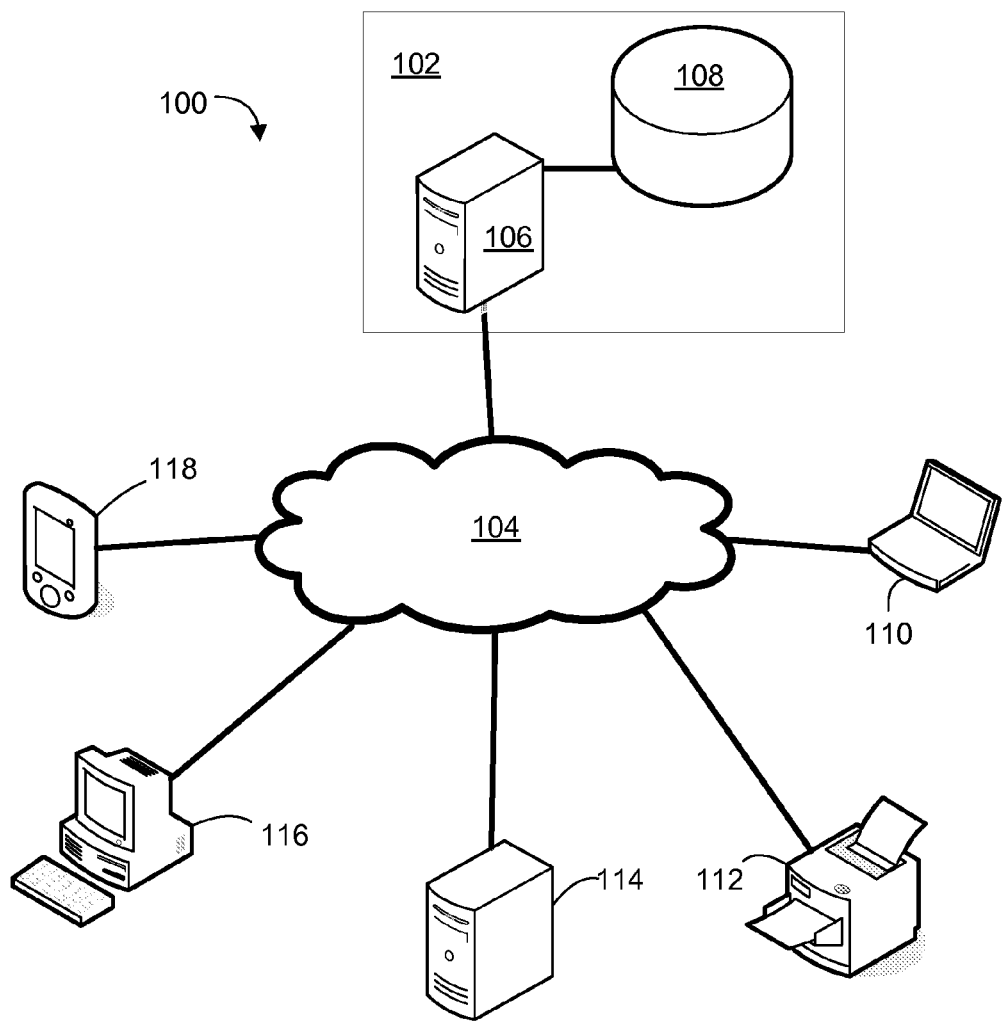
FIG. 1 is diagram showing an illustrative example of a network in which various clients may access a content reputation service.

We have recognized that the redundant scanning performed by existing systems occurs because an application or service running on one computer is unable to leverage results that were produced by other applications (running on the same computer or one or more different computers) over the same content. Antivirus applications are a good example. In existing systems, a file (and possibly its identical copies) moving within an organizations generally needs to be repeatedly scanned as it moves between different computers and servers (e-mail, file, collaboration etc.). We have further recognized that such repetitive scans and classifications may be avoided, for example, by providing a secure way of sharing results of prior scans and classifications with all instances of the same application or service and other interested parties who can leverage these results.

In some embodiments of the present invention, the results of scans, classifications, or any other operations performed over digital content as set of content claims may be persisted in a centralized repository, accessible by interested parties, in such a way that the claims are associated with the data over which they were generated. In some embodiments, for example, this may be accomplished through the use of a centralized content reputation service that is accessible over a network. Such a mechanism may allow future rescans and/or reclassifications of the unmodified (or duplicated) data to be avoided entirely, or at least in part. In some embodiments, the results (claim sets) may be stored separately from the data to which the claim pertains and the process would not require any modifications to the data itself. Such a solution may thus ensure the integrity and authenticity of any issued claims.

In some embodiments, the results of various types of content based hygiene and/or filtering technologies that are performed during content based analysis/inspection/scan may be made available as a set of content claims. Trusted services and applications may, for example, submit results of their operations to the content reputation service for storage along with an identifier that may be used to later access such results. In some embodiments, for example, a digital fingerprint of the evaluated content may be used as such an identifier. Any participating party may thereafter request existing claims for a given piece of digital content by calculating the fingerprint of the subject data (or otherwise determining the identifier) and sending it as part of a request to the content reputation service. The content reputation service may then return claims (if any) associated with the data to the requestor. The content reputation service may, for example, store claims in a relational database that uses the identifier as a key.

Such a technique may thus allow content claims to be reused at a future time for various purposes. One such purpose may be to avoid repetitive analysis/inspection/scan of the data when it doesn't change as it traverses computers on a network. Another such purpose may be to enable consumers of the data to make verifiable trust decisions using the content claims set. Yet another purpose may be to reduce consumption of computer resources used for hygiene, filtering, classification and other content inspections across the network. Furthermore, in some embodiments, the analysis of content claims residing in the database of the content reputation service may provide viable statistical information in regards to data usage, geographical migration of data, sources of infection, etc.

FIG. 1 shows an illustrative embodiment of a system 100 in which a content reputation service 102 may be accessed over a network 104. As shown, the content reputation service 102 may, for example, comprise one or more servers 106 (or other computing devices) having sufficient computing capabilities to process requests from all of the other devices in the system 100 that need to access the service 102. The computing devices of the content reputation service 102 can take on any of numerous forms, depending on the operational requirements and scale of the system 100 in which it is deployed, and the invention does not require the use of computing devices of any particular type or configuration. For large scale implementations, conventional scaling and/or load balancing techniques may, for example, be employed to distribute the processing of requests among various servers and/or other computing resources deployed within the service 102.

The database 108 may take on any of numerous forms and configurations, and the invention is not limited to the use of any particular type of database. In some embodiments, for example, the database 108 may be a relational database that stores and accesses one or more content claims associated with particular pieces of digital content using keys. In some embodiments, such keys may, for example, comprise digital fingerprints of the digital content for which the service maintains one or more content claims. Depending on performance and database size considerations, various tables and foreign keys may be employed to enhance performance. For example, in some embodiments, a table may map fingerprints to internal identity keys, and each such internal identity key may be used to access one or more content claims associated therewith. It should be appreciated, however, that in other embodiments, the database 108 may comprise any other database architecture or storage mechanism capable of associating identifiers (e.g., fingerprints) with corresponding stored content claims. In some embodiments, the content claims could even be stored in address-indexed storage device, e.g., a hard drive or RAM, and a table could be used to map fingerprints (or other another identifier) to memory addresses of corresponding content claims. As used herein, the term "database" is intended to encompass all such storage architectures.

The network 104 may be any of numerous networks, or groups of networks, and the invention is not limited to the use of a network of any particular type of configuration. The network 104 may, for example, comprise a local area network such as that used in a corporate environment and/or a wide area network such as the internet. Any network architecture and/or communication protocol may be employed in various embodiments. But a few examples of suitable networks and protocols include Ethernet, token-ring, TCP/IP, HTTP, SOAP, REST, RPC, XML-PRC, etc.

As shown in FIG. 1, in addition to the content reputation service 102 itself, the system 100 may additionally comprise various clients that can communicate with the service 102 over the network 104. Several examples of computing devices that might be clients of the service (e.g., because they are capable of submitting content claims to the service 102 and/or are capable of accessing content claims maintained by the service) are illustrated. It should be appreciated, however, that types of devices in addition to or in lieu of those shown may be employed, and the invention is not limited to the use of any particular type of device. In the example of FIG. 1, the illustrated clients include a laptop computer 110, a printer/fax/scanner 112, a server 114, a desktop computer 116, and a handheld computing device (e.g., a PDA, smartphone, etc.) 118.

As used herein, a "network node" refers to a device or group of devices that has or share a unique address, or address component, on a network. In some circumstances, a given network node may comprise one or more sub-nodes. In such a case, one component of a network address may uniquely identify the node on the network and another component of the address may uniquely identify each of the sub-nodes. In the example of FIG. 1, each of the content reputation service 102, the laptop computer 110, the printer/fax/scanner 112, the server 114, the desktop computer 116, and the handheld computing device 118 may be located at a different node of the network 104.

In some embodiments, the content reputation service 102 may, for example, accept, aggregate, store, and furnish upon request claims about digital content (files or any other type of data). Additionally, in some embodiments, steps may be taken to ensure that only trusted parties are allowed to submit claims to the service 102. In such embodiments, claims submitted from unknown or un-trusted clients will not be accepted. In some embodiments, there are no restrictions as to which clients are allowed to lookup existing claims.

As noted above, in some embodiments, claims may be associated with the data via digital fingerprints. Calculation of a digital fingerprint may be done in any of numerous ways, and the invention is not limited to any particular fingerprinting technique. In some embodiments, for example, fingerprints may be calculated using a cryptographic hash function. Such an implementation may provide good uniformity in resulting fingerprints and, depending on the hash function being used, may dramatically minimize the possibility of collisions (either accidental or intentional). Because cryptographic hash is a one-way function, it is impossible to deduce original content (or even its nature) from the hash value. Examples of suitable hash functions are SHA 1, SHA-256, and SHA-512. It should be appreciated, however, that other fingerprinting techniques could additionally or alternative employed in some embodiments. For example, for applications where data security is not an issue, a non-cryptographic hash function could additionally or alternatively be employed.

Digital fingerprints can generally be reliably determined with minimal computational effort and same piece of data will always yield the same digital fingerprint. Accordingly, in embodiments that use digital fingerprints as claim identifiers, any modification to the data will result in a different fingerprint and will automatically break the association of all existing claims with the modified copy of the file.

FIGS. 2 and 3 show examples of how clients may use fingerprints when interacting with the content reputation service 102. In particular, FIG. 2 shows an illustrative example of a routine that a client (e.g., one of the computing devices 110, 112, 114, 116, and 118 shown in FIG. 1) may execute to submit one or more claims to the content reputation service 102, and FIG. 3 shows an example of a routine a client may execute to obtain one or more existing claims maintained by the service 102. The illustrated routines may, for example, be implemented using instructions stored in a computer-readable medium that can be accessed and executed by a processor of a client machine.

As shown in FIG. 2, after processing data (e.g., performing a virus or malware scan, classifying data, etc.) (step 202), a client may create one or more claims expressing the results of the processing that was performed (step 204). After creating the one or more claims, the client may calculate a fingerprint of the data (step 206), and then submit the one or more claims, together with the calculated data fingerprint, to the content reputation service 102, e.g., by sending a message to the service 102 via the network 104 (step 208). As discussed further below, in some embodiments, such a message may include a client-side digital certificate, signed by a trusted Certification Authority, identifying the product used to create the one or more claims. Such a technique may, for example, help prevent potential attacks intended to poison the database 108.

As shown in FIG. 3, prior to committing resources to evaluating the content of a particular piece of data (e.g., by performing a virus or malware scan, classifying data, etc.), a client may calculate a fingerprint for the data (step 302), and submit the fingerprint to the content reputation service 102 as a part of a request for existing claims (step 304). If the reputation service 102 identifies any claims associated with the submitted fingerprint, it may retrieve and return those claims to the client (step 306). The client may then make a further decision as to whether and/or how to evaluate the data based upon the information contained in any returned claims (step 308). In some embodiments, messages received by the content reputation service 102 may carry a valid, verifiable certificate, thus allowing clients to confirm that they are communicating with a trusted source. In addition, in some embodiments, the returned claims may also be digitally signed so as to further enhance the security and reliability of the system.

In some embodiments, an unlimited number of content claims may be associated with a given piece of data. Although such claims may be created by different trusted issuers, when they are issued over the same piece of data (which yields same fingerprint value), they all may be grouped by the data fingerprint.

In certain implementations, when a client makes a request of the content reputation service 102 to return claims about digital content, the client may either request all existing claims or narrow the scope of the returned set by specifying the type of claims it is interested in (e.g., issuer, time claims were issued, content assertions etc.).

As noted above, in some implementations, any modification to the data will lead to a different calculated fingerprint. Thus, any modification to a file will automatically disassociate the file with all previously issued claims.

Table 1 (below) shows an illustrative example of the properties/attributes that may be contained within a single content claim.

TABLE 1

| Property | Description |
| --- | --- |
| Claim Type | Type of the claim. There may be a number of predefined content claim types. Consumers of the content reputation service may also define their own claim types. |
| Claim Time | Date and time when the claim was issued. |
| Assertion | Assertion about content. The meaning of the assertion may be interpreted according to the claim type. For example, if claim type is "Virus" and assertion is "PropertyAbsent," may be interpreted to mean that the content is virus free. Likewise, claim type "MaliciousURL" in conjunction with assertion "PropertyPresent" may be interpreted to mean that the content contains a malicious URL. In addition to predefined assertions, claim issuers may define their own assertions. |
| Issuer | Entity that issued this claim. This may, for example, identify a particular application, service, user, etc. |
| Data | Optional custom data issuer may attach to claim. The reputation service need not attempt to interpret this data; it may simply store it and return it back with the claim, when requested. For example, an antivirus application may submit the virus engine or signature version with each virus claim it makes. This way, when it receives claims back, it can determine that the virus engine or signatures were updated since the claim it just received was issued. It may thus decide to scan file anyway, despite existing claim that file is clean and then submit a new claim. |

As pointed out previously, in some embodiments, multiple claims, potentially issued by different entities, may exist in the database 108 of the content reputation service 102. When requested, such claims may be returned as a "claim set."

Table 2 (below) shows an illustrative example of how such a claim set may be formatted.

TABLE 2

ClaimSet
Fingerprinting Algorithm
Fingerprint Value
Claim 1
Claim 2
Claim . . .
Claim N FIG. 4 is a conceptual representation of a claim set including actual claim data (in this case, for an image).

In some embodiments, different claim sets may be returned in different formats depending on the protocol used to communicate with the content reputation service 102. Clients may, for example, communicate with the service using SOAP messages (web service) or any other network protocol that supports either connection or packet/message based security (e.g., REST, HTTP, RPC, XML-PRC etc.). In some embodiments, implementation of the service may also support multiple bindings and/or be able to communicate using different protocols at the same time. The content reputation service may be installed on premises, in the cloud, or both.

As noted above, in some embodiments, in order to prevent database poisoning and other types of attacks, only trusted applications may be allowed to submit content claims. The trust mechanism may, for example, employ widely used industry standards such as WS-Trust and server and client side certificates for such a purpose.

In some embodiments, regardless of the protocol being used to communicate with the content reputation service 102, all content claims may be stored in centralized relational database 108 with the fingerprint used as the primary key.

FIGS. 5 and 6 show examples of how the content reputation service 102 may process received requests from clients to submit and retrieve content claims. In particular, FIG. 5 shows an illustrative example of a routine one or more servers 106 of the content reputation service 102 may execute, together with the database 108, to process a client request to submit one or more claims, and FIG. 6 shows an example of a routine such server(s) may execute, together with the database, to process a client request to retrieve and return one or more content claims. The illustrated routines may, for example, be implemented using instructions stored in one or more computer-readable mediums that can be accessed and executed by one or more processors of the server(s) 106 and/or controllers of the database 108.

As shown in FIG. 5, upon receiving a client request to submit one or more claims to the service 102 (step 502), if the same claim (e.g., the same claim type and assertion) does not already exist in the database 108 (see step 503), a server 106 may format the received claim(s) and write them the database 108 using the received fingerprint as the primary key for the database entry (step 504). As noted above, in some embodiments, the server(s) 106 may refuse to accept any new claim submissions that is not signed by a trusted Certification Authority or does not identify the product used to create the claim.

In some embodiments, if the same claim is found to already exist in the database 108 for the submitted digital fingerprint (see step 503), the content reputation service 102 may evaluate the content of the new claim against that of the existing claim and update some or all of the information in the claim based upon that evaluation (step 505).

One example of a scenario in which the content reputation service 102 may update information for an existing claim is where, for example, a newly-submitted claim contains a virus signature version that is more recent than the virus signature version of an existing claim associated with the same digital fingerprint. Such a scenario may occur, for example, when a client decides to scan a file in spite of existence of an existing claim for the file because the client possesses a more recent virus signature version than that which is reflected in the existing claim. After performing the scan using the updated virus signature version, the client in such a scenario may, for example, submit a virus claim (reflecting the virus signature version that was employed for the scan) to the content reputation service 102.

When content reputation service 102 receives such a claim, it may, for example, determine that a claim of the same type, with the same assertion (and possibly even from the same issuer) already exists. The content reputation service 102 may then, for example, compare the virus signature versions, as well as the creation dates and times of the respective claims, and update entries in the database 108 (e.g., database columns) with what it determines to be the most up-to-date and reliable information for the claim. In the case of an updated virus signature version, the updated entries for the existing claim may, for example, include the date and time of the virus scan and the virus signature version used for the scan.

As shown in FIG. 6, upon receiving a client request to retrieve existing claims (step 602), a server 106 may formulate a database query using the fingerprint included in the client request as the primary key (step 604). If a matching fingerprint exists in the database 108 (step 606), the server 106 may retrieve the claim(s) associated with the fingerprint (step 608), filter those claims according to any criteria specified by the client (step 609), and return the filtered claim data (which may be either a subset of the retrieved claim data or the entire claim set if filtering is not employed or if no filtering criteria are specified by the client) to the requesting client (step 610). If a matching fingerprint does not exist in the database (step 606), the server 106 may inform the client that no matching claims were found (step 612). The content reputation service 102 may thus identify any claims that are associated with a given piece of data by comparing a calculated fingerprint for the data (received from the client) with a fingerprint stored in the database that is associated with the claims for the data in question.

In practice, content claims may be created when data is subjected to a certain type of analysis for the first time within the system 100. Thereafter, as data travels within the system and needs to be accessed, previously issued claims may be used in order to get necessary information about the data without analyzing it all over again. In some embodiments, additional claims about data may be added when new types of scans are performed on the data, thus extending the claim set with new information.

The following practical example illustrates how the content reputation service 102 may be employed to minimize the resources that need to be devoted to examining the content of a particular piece of data. First, consider the common situation where a document file (e.g., a MICROSOFT WORD® document) is attached to an e-mail that is sent to somebody within an organization. Upon receiving the e-mail with the attachment, the organization's edge server may scan the attachment, determine that it is free of virus, spyware, and malicious URLs, and create three claims with the content reputation service 102. The recipient may then, for example, receive the file and upload it to the organization's internal SHAREPOINT® site. (Suppose that the security policy that is enforced on this SHAREPOINT® site requires that all files be scanned for viruses, spyware, malicious URLs, and DLP.) During upload, the security scanner for the SHAREPOINT® site may calculate the file's fingerprint and send a request to the content reputation service 102. The claim set, including the three previously created claims, may then be returned. As a result, the security scanner may determine that only a DLP scan needs to be performed on the file and, after performing such a scan, may issue additional DLP claims to the content reputation service. Thereafter, if, for example, the same file is uploaded to another SHAREPOINT® site within the organization, the security scanner for that SHAREPOINT® site may determine that no other scans need to be performed, because a request to the content reputation service by that security scanner will return all necessary claims.

Importantly, in most circumstances, the overhead caused by interaction with the content reputation service 102 may be significantly lower than that of an actual scan or other data evaluation process. It should also be noted that, in some embodiments, inclusion of additional data inspection processes (which increases scan/evaluation time) will not have an adverse effect on claim submission and lookup time.

In certain embodiments, the content reputation service 102 may export a content claim or claim set as digitally signed file, e.g., an XML file. This "content certificate" may, for example, be delivered with or without (if the recipient already possesses this data) corresponding data to parties who for one reason or another have no access to the content reputation service and cannot communicate with it directly. Despite this fact, the recipient may reliably verify the validity of the content certificate, and, if valid, may decide to trust some or all of the included content claims.

FIG. 7 shows an example of how the claim set shown in FIG. 4 may appear when exported as a content certificate. Such an XML file may, for example, be signed using enveloped XML digital signature. The recipient of such a file may first verify the digital signature, to make sure that integrity of the XML is intact. If the signature is valid, the recipient may, for example, calculate the fingerprint of the data using an algorithm specified in the XML. If resulting value matches the fingerprint value in the XML, then the recipient may determine that all claims in this XML file are relevant to the data and can be trusted. Thus, in some embodiments, the recipient of such a content certificate is able to identify one or more claims that are associated with a given piece of data by comparing the calculated fingerprint for the data with a fingerprint included in the content certificate that also contains the claim(s). In some embodiments, a verification tool may be provided that automates verification of such content certificates.

Although perhaps not desirable in at least some circumstances, in some embodiments, content certificates may additionally or alternatively be directly appended to or embedded within a file to which it pertains. One example of a file type where such an implementation may be possible is email. A content certificate may, for example, be placed in the header space of the email without affecting the rest of the mail content. Some file formats, e.g., MICROSOFT OFFICE® files, also allow for extensibility where additional payload may be stored. Additionally, in some embodiments, a generic file wrapping envelope that stores both the original file and the content certificate may be employed. Microsoft's® Generic File Protection (GFP) file wrapper may, for example, be used for such a purpose.

The use of content certificates for data items (whether as separate files or as information that is appended to or embedded within such items) may also offer some additional flexibility when the data item itself has been modified. In some embodiments, for example, at least some reclassification of content (e.g. PII, HBI, etc.) may be avoided by employing classification technology that generates a "soft hash" which can be used to determine how close the document is to the original. In such embodiments, if the result is within a tolerance, the entire reclassification process may be avoided.

Having thus described several aspects of at least one embodiment of this invention, it is to be appreciated that various alterations, modifications, and improvements will readily occur to those skilled in the art.

Such alterations, modifications, and improvements are intended to be part of this disclosure, and are intended to be within the spirit and scope of the invention. Accordingly, the foregoing description and drawings are by way of example only.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the invention may be embodied as a computer readable medium (or multiple computer readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other non-transitory, tangible computer storage medium) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above. As used herein, the term "non-transitory computer-readable storage medium" encompasses only a computer-readable medium that can be considered to be a manufacture (i.e., article of manufacture) or a machine.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A method comprising:
   receiving, by a server, a plurality of content claims for a data item, the plurality of content claims for the data item including content claims submitted by a plurality of different issuers that scanned the data item for malicious content, wherein each content claim of the plurality of content claims for the data item identifies an issuer that submitted the content claim, indicates timing and results of a scan performed by the issuer, and is submitted with a digital fingerprint of the data item calculated by the issuer using a hash function;

storing, by the server, the plurality of content claims for the data item in a database that associates each content claim of the plurality of content claims for the data item with a digital signature of the data item that was submitted with the content claim;

grouping, by the server, multiple content claims of the plurality of content claims for the data item that were submitted by different issuers with a same digital fingerprint of the data item, wherein the same digital fingerprint of the data item was calculated by the different issuers using a particular hash function;

receiving, by the server from a computing device, a request to retrieve existing content claims associated with a piece of data, the request including a determined digital fingerprint of the piece of data calculated by the computing device using the particular hash function;

retrieving, by the server in response to the request, a content claim set including the multiple content claims of the plurality of content claims for the data item that were submitted by different issuers upon determining that:
the determined digital fingerprint of the piece of data matches the same digital fingerprint of the data item associated with each of the multiple content claims, and
each of the multiple content claims was issued within a predetermined time period; and returning, by the server to the computing device, the content claim set for allowing the computing device to determine whether to scan the piece of data for malicious content.

2. The method of claim 1, further comprising:
receiving, by the server, a new content claim for the data item; and
evaluating, by the server, the new content claim for the data item against any stored content claims for the data item that are associated with a digital fingerprint of the data item submitted with the new content claim.

3. The method of claim 2, wherein:
each content claim of the plurality of content claims for the data item further identifies an antivirus application used to perform the scan and a version of the antivirus application,
the new content claim for the data item indicates timing and results of a scan performed by the computing device on the piece of data using a more recent version of an antivirus application identified by at least one of the multiple content claims.

4. The method of claim 1, further comprising:
verifying, by the server, that each content claim of the plurality of content claims for the data item was submitted by a trusted issuer.

5. The method of claim 1, further comprising:
digitally signing a message used to transmit the content claim set to the computing device that sent the request.

6. The method of claim 1, further comprising:
receiving, by the server, a content certificate for each content claim of the plurality of content claims for the data item, wherein each content certificate is signed by a trusted certificate authority and identifies a product used to create the content claim.

7. The method of claim 1, wherein the content claim set comprises:
a content claim indicating results of an antivirus scan performed by a first issuer, and
a content claim indicating results of a malware scan performed by a second issuer.

8. A computer-readable storage device storing computer-executable instructions that, when executed by a computer, cause the computer to perform a method comprising:
receiving a plurality of content claims for a data item, the plurality of content claims for the data item including content claims submitted by a plurality of different issuers that evaluated the data item for malicious content, wherein each content claim of the plurality of content claims for the data item identifies an issuer that submitted the content claim, indicates timing and results of a scan performed by the issuer, and is submitted with a digital fingerprint of the data item calculated by the issuer using a hash function;

storing the plurality of content claims for the data item in a database that associates each content claim of the plurality of content claims for the data item with a digital signature of the data item that was submitted with the content claim;

grouping multiple content claims of the plurality of content claims for the data item that were submitted by different issuers with a same digital fingerprint of the data item, wherein the same digital fingerprint of the data item was calculated by the different issuers using a particular hash function;

receiving, from a computing device, a request to retrieve existing content claims associated with a piece of data, the request including a determined digital fingerprint of the piece of data calculated by the computing device using the particular hash function;

retrieving, in response to the request, a content claim set including the multiple content claims of the plurality of content claims for the data item that were submitted by different issuers upon determining that:
the determined digital fingerprint of the piece of data matches the same digital fingerprint of the data item associated with each of the multiple content claims, and
each of the multiple content claims was issued within a predetermined time period; and returning, to the computing device, the content claim set for allowing the computing device to determine whether to scan the piece of data for malicious content.

9. The computer-readable storage device of claim 8, wherein the method further comprises:
receiving a new content claim for the data item; and
evaluating the new content claim for the data item against any stored content claims for the data item that are associated with a digital fingerprint of the data item submitted with the new content claim.

10. The computer-readable storage device of claim 9, wherein:
each content claim of the plurality of content claims for the data item further identifies an antivirus application used to perform the scan and a version of the antivirus application,
the new content claim for the data item indicates timing and results of a scan performed by the computing device on the piece of data using a more recent version of an antivirus application identified by at least one of the multiple content claims.

11. The computer-readable storage device of claim 8, wherein the content claim set comprises:
a content claim indicating results of an antivirus scan performed by a first issuer, and a content claim indicating results of a malware scan performed by a second issuer.

12. The computer-readable storage device of claim 8, wherein the method further comprises:
digitally signing a message used to transmit the content claim set to the computing device that sent the request.

13. The computer-readable storage device of claim 8, wherein the method further comprises:
receiving a content certificate for each content claim of the plurality of content claims for the data item, wherein each content certificate is signed by a trusted certificate authority and identifies a product used to create the content claim.

14. The computer-readable storage device of claim 8, wherein the method further comprises:
verifying that each content claim of the plurality of content claims for the data item was submitted by a trusted issuer.

15. A system, comprising:
a processor configured to execute computer-executable instructions; and
memory storing computer-executable instructions for:
receiving a plurality of content claims for a data item, the plurality of content claims for the data item including content claims submitted by a plurality of different issuers that evaluated the data item for malicious content, wherein each content claim of the plurality of content claims for the data item identifies an issuer that submitted the content claim, indicates timing and results of a scan performed by the issuer, and is submitted with a digital fingerprint of the data item calculated by the issuer using a hash function;
storing the plurality of content claims for the data item in a database that associates each content claim of the plurality of content claims for the data item with a digital signature of the data item that was submitted with the content claim;
grouping multiple content claims of the plurality of content claims for the data item that were submitted by different issuers with a same digital fingerprint of the data item, wherein the same digital fingerprint of the data item was calculated by the different issuers using a particular hash function;
receiving, from a computing device, a request to retrieve existing content claims associated with a piece of data, the request including a determined digital fingerprint of the piece of data calculated by the computing device using the particular hash function;
retrieving, in response to the request, a content claim set including the multiple content claims of the plurality of content claims for the data item that were submitted by different issuers upon determining that:
the determined digital fingerprint of the piece of data matches the same digital fingerprint of the data item associated with each of the multiple content claims, and
each of the multiple content claims was issued within a predetermined time period; and
returning, to the computing device, the content claim set for allowing the computing device to determine whether to scan the piece of data for malicious content.

16. The system of claim 15, wherein the memory further stores computer-executable instructions for:
receiving a new content claim for the data item; and
evaluating the new content claim for the data item against any stored content claims for the data item that are associated with a digital fingerprint of the data item submitted with the new content claim.

17. The system of claim 16, wherein:
each content claim of the plurality of content claims for the data item further identifies an antivirus application used to perform the scan and a version of the antivirus application,
the new content claim for the data item indicates timing and results of a scan performed by the computing device on the piece of data using a more recent version of an antivirus application identified by at least one of the multiple content claims.

18. The system of claim 15, wherein the content claim set comprises:
a content claim indicating results of an antivirus scan performed by a first issuer, and
a content claim indicating results of a malware scan performed by a second issuer.

19. The system of claim 15, wherein the memory further stores computer-executable instructions for:
digitally signing a message used to transmit the content claim set to the computing device that sent the request.

20. The system of claim 15, wherein the memory further stores computer-executable instructions for:
receiving a content certificate for each content claim of the plurality of content claims for the data item, wherein each content certificate is signed by a trusted certificate authority and identifies a product used to create the content claim.

* * * * *